United States Patent

[11] 3,579,271

[72] Inventor Marc Paul Pomerantz
 Old Bridge, N.J.
[21] Appl. No. 714,090
[22] Filed Mar. 18, 1968
[45] Patented May 18, 1971
[73] Assignee E.I. du Pont de Nemours and Company
 Wilmington, Del.

[54] METHOD OF MEASURING COATING WEIGHT BY USING STRONTIUM AS A TRACER
 6 Claims, No Drawings

[52] U.S. Cl. ................................................. 250/51.5,
 73/150, 96/82, 118/9, 250/83.3
[51] Int. Cl. ................................................. G01n 23/22
[50] Field of Search ................................................. 73/150;
 96/82; 118/9; 250/51.5, 83.3 (D), 106 (T); 324/71
 (Misc) (GG) (NEP); 117/(Inquired)

[56] References Cited
UNITED STATES PATENTS

| | | | |
|---|---|---|---|
| 2,640,788 | 6/1953 | Rockett, Jr. ................... | 118/9X |
| 2,897,371 | 7/1959 | Hasler ......................... | 250/83.3 |

FOREIGN PATENTS

| | | | |
|---|---|---|---|
| 920,356 | 3/1963 | Great Britain ................ | 250/83.3 |

Primary Examiner—William F. Lindquist
Attorney—Lynn Barratt Morris

ABSTRACT: A process of measuring the dry coating weight of a gelatin coating by adding a given amount of strontium to the coating solution before coating, then analyzing the dried coating to determine the amount of strontium present, thereby, indicating the coating weight.

METHOD OF MEASURING COATING WEIGHT BY USING STRONTIUM AS A TRACER

BACKGROUND OF THE INVENTION

1. Field of the Invention

A process of determining the dry coating weight of a coating in a photographic element.

2. Description of the Prior Art

In the art of photography, it frequently becomes necessary to know the dry coating weight of a particular layer coated onto a multilayered film structure. Where the coated layer contains silver it is old art to analyze a sample to determine the amount of silver present thereby indicating the coating weight of the silver bearing layer. When it is desirable to known the dry coating weight of a silver-free layer of a film structure there is usually no element present in sufficient quantity which readily lends itself to nondestructive analysis. Therefore, coating weight determinations of a silver free layer must be made by destructive testing, if they can be made at all. It is an object of this invention to provide a method of measuring the dry coating weight of a silver-free coating in a photographic film structure. This object is carried out by adding a given amount of strontium to the coating solution before the solution is coated then analyzing the dry coating for strontium. This method is not limited to use in photographic elements.

Some present well known methods of measuring dry coating weights are titration, gravimetric determination, coating rate of consumption, X-ray spectrographic analysis and atomic absorption. These known methods all present one or more difficulties. Titration, while accurate is very tedious. Gravimetric determinations which require one to weigh the difference between the coated film and the uncoated film is not accurate enough when dealing with thin coatings or when dealing with a film structure of more than one layer. The coating rate of consumption method provides an average coating weight for a large area of film base coated, but it is not accurate enough for determining the coating weight of one small particular area. The X-ray spectrographic analysis while convenient, accurate and reliable, depends on the presence of some element in the coating to analyze. The same is true with the atomic absorption method of testing. This invention supplies the element to analyze and makes it possible to employ methods of tracer analysis such as the X-ray spectrographic analysis and atomic absorption spectrophotometry.

Reference to the use of strontium is suggested in Baker's "Photographic Emulsion Technique" (Second Edition, 1948, American Phot. Publishing Co., Boston, Mass.) where strontium chloride and lithium chloride are used as a source of chloride ion in forming silver in a collodion type chloride printing-out paper. In this application strontium is added to a silver bearing layer and it is used as a means of obtaining warmer tones. Sottysiak, U.S. Pat. No. 2,935,405, May 3, 1960, teaches the use of strontium during the precipitation of silver halide to obtain gradation stability. Strontium chloride in combination with sodium chloride in the presence of other halides is added during the precipitation of silver halide in a carrier colloid such as gelatin to form a photographic paper emulsion. Neither reference teaches the addition of strontium to a substantially metal-free coating for the purpose of measuring coating weights.

SUMMARY OF THE INVENTION

A method of determining the dry weight of a coating on a support comprising: (A) adding a strontium salt, strontium hydroxide or a strontium oxide to a substantially nonmetallic coating solution; (B) applying the coating solution to a support; (C) drying the coating solution; and (D) measuring the amount of strontium present with the proviso that said support has no other layer containing strontium. The measurement is preferably made by nondestructive X-ray spectrographic analysis.

DESCRIPTION OF THE PREFERRED EMBODIMENT

Where it is desirable to measure the dry coating weight of a layer in an element, it has been found that a known portion of strontium added to the solution before coating may thereafter be measured in the dry coating to determine the coating weight. The element may be a photographic or a nonphotographic element. Whether the element is photographic or nonphotographic, the amount of strontium added must not be below the detection limit of the apparatus used in measuring the dry coating weight. Where the element is photographic, the maximum amount of strontium must be less that the amount that will desensitize the film to render the film unusable.

Strontium as the added ingredient to a coating solution must be compatible with and uniformly dispersible in the coating solution. Generally the strontium is added to layers which are substantially metal free. This is due to the fact that many coatings contain no substantial amount of a measurable metal and strontium is added in selected quantities to the coating composition to give a direct relationship between the coating weight and the amount of strontium added.

It has been found that strontium salts, hydroxides, and oxides were the most effective compounds for use particularly when added to a gelatin filter or nonhalation layer of the following general formula, water, gelatin, hardeners, wetting agents, salts, alcohols and dye, or to an antiabrasion layer of the following general formula, water, gelatin, hardeners, wetting agents, salts, alcohol and optionally silica. Where the coated product is a photographic film, some specific examples of strontium compounds which do not materially effect the photographic properties of the film such as speed, fog or haze are strontium nitrate, strontium chloride, strontium perchlorate, strontium lactate and strontium acetate.

When a known amount of strontium is added to a coating solution and the solution is coated and dried, the coating weight of the layer containing strontium may be determined by measuring the amount of strontium present. Various methods are known for detecting a tracer element. Some methods require destructive testing as in atomic absorption spectrophotometric analysis where the sample is vaporized in the presence of a cathode ray and the wavelengths emitted are analyzed to determine the amount of tracer present. This may be done by a Perkin-Elmer Model 290 Atomic Absorption Spectrophotometer made by Perkin-Elmer Corp. of Connecticut. A preferred method of analysis is by nondestructive testing such as that carried out by X-ray spectrographic analysis. Both qualitative and quantitative results may be obtained regardless of the free or combined state of the strontium being analyzed. A sample is irradiated by an intense X-ray beam and emits a characteristic X-ray spectrum. This secondary radiation passes through collimating parallel foils and into an analyzing crystal oriented to present a selected atomic spacing to reflect characteristic wavelengths at given angles. The crystal is rotated and the wavelengths pass into a detector. The detector is set at the given angle for strontium and the spectral intensity is recorded on a chart. The pulse count of the strontium is an indication of the quantity present. The pulse counts are represented as net counts per second. A suitable X-ray spectrographic analyzer is the Norelco X-ray Spectrograph made by North American Philips Company, Inc., New York.

In order for X-ray spectrographic analysis to be useful a standard must be established. This is done by making a series of samples, each coated at a different coating thickness with the coating solution containing a known proportion of strontium. After drying, each sample is divided into two parts. One part is subjected to a method of measuring the actual coating weight while the second part is subjected to the X-ray spectrographic analysis where the amount of the strontium present is measured in counts per second. After each sample in the series has been similarly tested a graph is plotted with the net counts per second as read on the X-ray spectrographic analyzer as the ordinate and the corresponding actual coating weight as the abscissa. This graph serves as a standard for coatings made with a given proportion of strontium present and thereafter when it is necessary to determine the coating weight of a sample coated with a known proportion of strontium, the sample is subjected to X-ray spectrographic analysis, the net counts per second determined and this compared to the standard graph for a determination of the actual coating weight.

In a method of analysis such as X-ray spectrographic analysis or atomic absorption, one precaution must be taken. Where strontium is used as a tracer in one coating layer of a multilayered structure no other layer may contain strontium during the analysis, otherwise, an interference occurs and a false measurement results. Any such undersired coating layer must be removed before the sample can be properly analyzed for its coating weight.

A preferred embodiment of this invention is to add strontium nitrate to an antiabrasion layer used to protect a photographic film element. The photographic element may be an X-ray film constructed in the following manner: a 0.007-inch oriented polyethylene terephthalate support coated with a 0.0005-inch mil thick synthetic resin copolymer as described in Rawlins, filed Oct. 8, 1965, U.S. Pat. Ser. No. 494,257, U.S. Pat. No. 3,443,950, May 13, 1969 a 0.0007-inch gelatin layer coated over the copolymer and a gelatino-silver iodobromide X-ray type emulsion coated over the gelatin layer. Covering the X-ray emulsion is the antiabrasion layer containing strontium nitrate. The antiabrasion layer may be made by mixing 200 grams of gelatin with 8000 grams of water and digested for 15 minutes at 130° F. After digestion, conventional hardeners, surfactants and wetting agents are added along with alcohol and silica. To this solution 13.33 grams of strontium nitrate dissolved in water are added and the total solution thoroughly mixed until a uniform dispersion of the strontium nitrate is assured. The solution is coated over the silver halide layer, chilled at 40° F. then dried.

Although 13.33 grams of strontium nitrate per 200 grams of gelatin is specified for use in a preferred embodiment of a preferred range of strontium to gelatin ratio is 0.045 to 0.120 mole of strontium per 200 grams of gelatin in a photographic element where the method of measuring strontium is by X-ray spectrographic analysis.

It has been observed that part of the strontium compound contained in a coated layer in a photographic film structure washes out of the film during development. The effect of a build up of strontium in the developer was investigated by adding four times the amount of strontium that could be washed out of the film to the developer and results compared to a control developer where no strontium was present. Observations indicated no difference in the life or effect of the developer solutions.

The invention will be further illustrated but is not intended to be limited by the following examples.

Example 1

A gelatin-backing coating solution was made by digesting 200 grams of gelatin in 2,445 grams of distilled water for 15 minutes at 125° F. then adding conventional hardeners and surfactants along with wetting agents, salts, alcohol, dye and more water. To this solution 16.8 grams of strontium chloride ($SrCl_2 \cdot 6H_2O$) in water was added and the total solution throughly mixed. The solution was coated onto 0.004-inch polyethylene terephthalate at five different coating thicknesses. Each of the five samples was chilled at 40° F., then dried at 65° F. wet bulb and 75° F. dry bulb.

Each of the five samples was then divided into two parts with one part analyzed to determine the coating weight of the gravimetric method while the second part of the sample was exposed to an X-ray spectrographic analysis. The results were as follows:

| Sample Number: | Gravimetric measurement coating weight in mg./dm.$^2$ | X-ray spectrographic analysis net counts per second |
|---|---|---|
| 1 | 6.3 | 62 |
| 2 | 15.4 | 228 |
| 3 | 24.3 | 328 |
| 4 | 66.0 | 943 |
| 5 | 85.0 | 1,332 |

From these measurements a graph was constructed where the coating weights (mg./dm.$^2$) were plotted as the abscissa and the net counts per second were plotted as the ordinate. A sixth sample was then prepared in the above manner where the coating weight was unknown. The sixth sample was subjected to X-ray spectrographic analysis and gave a net count per second of 735 indicating a gelatin coating weight of 42.3 mg./dm.$^2$ from the graph constructed above. The sample was then analyzed by the gravimetric method and the coating weight determined to be 42.9 mg./dm. 2. This error was only 1.4 percent.

Example 2

A uniform abrasion layer of 10 mg./dm.$^2$ was coated over 5 different emulsion coating weights. The basic film structure was a 0.007-inch oriented polyethylene terephthalate support coated with a synthetic copolymer as described in Rawlins filed Oct. 8, 1965, U.S. Pat. Ser. No. 494,257, a gelatino-silver iodobromide emulsion of the X-ray type containing 1.2 mole percent of silver iodide and 98.8 mole percent silver bromide, and a gelatin-dextran binder as described in Jennings, U.S. Pat. Ser. No. 3,063,038 where the ratio of binder to silver halide was 1.1 to 1. All the abrasion layers contained 2.6 percent gelatin, 0.063 mole of strontium chloride ($SrCl_2.6H_2O$) per 200 grams of gelatin along with conventional hardeners, surfactants, wetting agents, salts, and water. The five different X-ray emulsion coating weights of silver bromide in mg./dm.$^2$ were varied as follows: (a) 77.3; (b) 91.5; (c) 109.3; (d) 133.5 and (e) 148.5.

After coating and drying, each sample was subjected to X-ray spectrographic analysis to measure the coating weight of the antiabrasion layer and no substantial difference was observed in the strontium readings. This indicates that the strontium signal received by X-ray spectrographic analysis is not dependent on the amount of silver contained in the emulsion layers.

Example 3

A film structure was made in the manner described in Example 2 except the photographic X-ray emulsion and the abrasion composition were uniformly coated at 105.4 milligrams of silver bromide/dm.$^2$ and 10 milligrams of gelatin/dm.$^2$ respectively. In the abrasion layer 0.063 mole of strontium was added per 200 grams of gelatin. Seven samples were made in which the strontium was added to the abrasion layer using seven different strontium compounds. Each sample was then subjected to sensitometric testing. The strontium compounds used and their relative sensitometric properties were compared to a control sample which did not contain strontium. The results are listed below.

| Compound: | Sensitometric comparison to control sample |
|---|---|
| Strontium acetate | Good. |
| Strontium lactate | Do. |
| Strontium nitrate | Do. |
| Strontium perchlorate | Fair. |
| Strontium chloride | Do. |
| Strontium bromide | Poor. |
| Strontium nitrite | Do. |

Example 4

The possibility that strontium might react with ingredients in the solution from which it is coated or ingredients in adjacent layers to form a precipitate and create a haze problem in photographic film was investigated. The degree of haze was determined by the amount of light scattered when passing through a sample in which the silver halide had been removed by fixation. The haze determination was made on unexposed and developed films since fog-silver deposits would also scatter light.

Two samples were made according to the basic film structure of Example 2 namely at 0.007-inch polyethylene terephthalate base coated with a synthetic copolymer, a gelatino-layer iodobromide X-ray emulsion and an abrasion layer containing strontium. The strontium compound was strontium chloride present in the amount of 0.063 mole of strontium per 200 grams of gelatin. On one sample the abrasion coating was 8 mg./dm.$^2$ and on the other it was 10 mg./dm.$^2$. The samples were fixed and subjected to a haze check. The haze of the coatings containing strontium was equivalent to the control coating which contained no strontium indicating that the addition of strontium to a photographic element does not create a haze problem.

Example 5

An abrasion layer was coated on a photographic quality paper base. The double weight paper was composed of all wood material and was baryta coated. The abrasion layer was the same as that described in Example 2, except it was diluted with water to a gelatin analysis of 2.2 percent.

After coating and drying, the amount of gelatin coated was measured gravimetrically, and found to be 45.0 mg./dm.$^2$. A second sample was measured using X-ray spectrographic analysis and the gelatin weight was determined to be 47.0 mg./dm.$^2$.

Example 6

A gel sub solution was made by digesting 21.6 gms. of decationized gelatin in 1,710 grams of distilled water for 15 minutes at 130° F. and then adding conventional hardeners, surfactants and wetting agents along with salts, alcohol and more water. To this solution 1.44 grams of strontium nitrate $Sr(NO_3)_2$ in water was added and the total solution thoroughly mixed. The solution was coated on top of a 0.007-polyethylene terephthalate support coated with a resin according to Rawlins filed Oct. 8, 1965, U.S. Pat. Ser. No. 494,257.

A gravimetric analysis of the coated and dried film indicated a gelatin coating weight of 3.0 mg./dm.$^2$. Determination of a second sample by X-ray spectrographic analysis indicated a gelatin weight of 3.1 mg./dm.$^2$.

An advantage of this invention is that it provides a method where nondestructive testing which is convenient, reliable and accurate may be used to determine the coating weight of a coating which is substantially free of metals traceable by conventional methods. It is particularly advantageous in measuring the coating weight of a layer which may be found under a cover layer. Although this advantage has particular use in the art of photography it may be applied to uses in other industries as the paper industry or the packaging industry where it is necessary to coat one material over another and it is desirable to measure the coating weight obtained.

I claim:

1. A method of determining the dry coating weight of a layer of a photographic element having a support which comprises
   a. adding a known quantity of a strontium salt, strontium hydroxide or a strontium oxide that does not effect the photographic properties of said element to a known quantity of a coating solution.
   b. applying said strontium carrying coating solution to a support,
   c. drying said coating solution on said support,
   d. measuring the quantity of strontium present in the dry layer, the element having no other layer containing strontium at the time the measurement is made, and
   e. comparing the measured quantity of the strontium compound with a standard graph of a series of samples of coatings of different thicknesses containing measured known quantities of the strontium compound.

The embodiments of the invention in which an exclusive property or privilege is claimed are defined as follows:

2. A method as in claim 1 where said coating solution is a gelatin solution.

3. A method as in claim 2 where strontium is added in amounts of 0.045 to 0.120 mole of strontium per 200 grams of gelatin.

4. A method as in claim 2 where said support is a photographic film base.

5. In a method for determining the dry coating weight of a nonlight-sensitive layer of a photographic element by coating a support with a light-sensitive silver halide layer and at least one nonlight-sensitive layer and measuring the weight of said nonlight-sensitive layer, the improvement of forming said nonlight-sensitive layer from a composition containing a known quantity of a strontium salt, strontium hydroxide or strontium oxide that does not effect the photographic properties of the silver halide and a known quantity of a coating solution, drying the formed layer, and measuring the quantity of strontium present by X-ray spectographic analysis, the photographic element having no other layer containing strontium, and comparing the measured quantity with a standard graph of a series of samples of coatings of different thicknesses containing measured known quantities of the strontium compound.

6. A method as in claim 5 where strontium is added in amounts of 0.045 to 0.120 mole of strontium per 200 grams of gelatin.